(12) United States Patent
Leger et al.

(10) Patent No.: US 7,757,102 B2
(45) Date of Patent: Jul. 13, 2010

(54) SECURE TERMINAL

(75) Inventors: Michel Leger, Meudon (FR); Alain Rhelimi, Meudon (FR)

(73) Assignee: Axalto SA, Meudon Cedex (FR)

( * ) Notice: Subject to any disclaimer, the term of this patent is extended or adjusted under 35 U.S.C. 154(b) by 359 days.

(21) Appl. No.: 10/583,571

(22) PCT Filed: Dec. 16, 2004

(86) PCT No.: PCT/IB2004/004160

§ 371 (c)(1),
(2), (4) Date: Jun. 19, 2006

(87) PCT Pub. No.: WO2005/062266

PCT Pub. Date: Jul. 7, 2005

(65) Prior Publication Data

US 2007/0116279 A1    May 24, 2007

(30) Foreign Application Priority Data

Dec. 18, 2003 (EP) .................................. 03293219

(51) Int. Cl.
*G06F 21/04* (2006.01)
(52) U.S. Cl. .................... 713/194; 726/35; 705/43; 902/2; 902/18; 902/31
(58) Field of Classification Search ........................ 902/2, 902/18, 31; 705/43; 713/194; 726/35
See application file for complete search history.

(56) References Cited

U.S. PATENT DOCUMENTS 4,731,842 A    3/1988    Smith et al.
6,098,170 A *  8/2000    Devanbu et al. ............. 713/176
6,279,825 B1   8/2001    Yokoyama et al.
7,121,460 B1 * 10/2006   Parsons et al. ............... 235/379

FOREIGN PATENT DOCUMENTS

| DE | 19600769 A1 | 7/1997 |
| EP | 0034885 A2 | 9/1981 |
| EP | 1152378 A2 | 11/2001 |

OTHER PUBLICATIONS

ISA/EP, International Search Report for PCT/IB2004/004160, Feb. 17, 2005, 3 pages.
Preliminary Examination Report dated Dec. 16, 2004 with English Translation (8 pages).

* cited by examiner

*Primary Examiner*—Emmanuel L Moise
*Assistant Examiner*—Paul Callahan
(74) *Attorney, Agent, or Firm*—Osha • Liang LLP

(57) ABSTRACT

A secure terminal comprises: primary means consisting of processing means, data and program storage means, security means and data input means, wherein the components of the primary means are interconnected by a first data bus; peripheral means consisting of printing means, means for reading from/writing to a card and means for accessing a telecommunications network, wherein the components of the peripheral means are interconnected by a second data bus; and power supply means connected to the primary and peripheral means. The primary means are grouped in a main housing that cannot be dismantled without damaging at least one of the components of the primary means, and the peripheral means are grouped in at least one housing capable of being connected to the main housing.

19 Claims, 2 Drawing Sheets

SECURE TERMINAL

CROSS-REFERENCE TO RELATED APPLICATIONS

This application claims the benefit, pursuant to 35 U.S.C. §119, of Patent Cooperation Treaty Application No. PCT/IB2004/04160 filed on Dec. 16, 2004, which claims priority of European Patent Application No. 03293218.8 filed Dec. 18, 2003.

FIELD OF THE INVENTION

This invention relates to secure terminals, for example, bank terminals or health terminals.

A bank terminal, connected to a telecommunication network, can carry out a bank transaction by the insertion of a bankcard with a magnetic strip or chip in the terminal, authentication of the cardholder, and entry of the nature and details of the transaction.

A health terminal, connected to a telecommunication network, allows analog access to medical or social security data relating to a holder of a health card with a magnetic strip and/or chip.

BACKGROUND

FIG. 1 illustrates the functional diagram of a secure terminal TS, specifically banking, according to the previous design.

Such a terminal incorporates a group of functions, such as:
a central processing unit 1 (micro-controller),
a keypad 2,
a volatile memory 3,
a non-volatile memory 4,
a display 5,
a printer 6,
an external connection interface 7,
a magnetic card reader 8 and/or chip card reader 9,
a means of connection to a telecommunication network 10, and
a power supply unit 11 as energy (battery and/or mains).

These components are connected by a bus group 12 of different natures (power supply, memory, control) and are well known to the man skilled in the art. The whole is based on one or more printed circuits distributed in one or more boxes.

Implementation of this type of terminal is conventional other than that certain security elements must be added in order to proscribe all manipulations capable of altering or extracting financial information (personal identification number PIN, banking transactions, medical files, etc.).

For technical, financial and security reasons, the central unit (micro-controller), memories and certain peripherals for the input/output of sensitive data are confined to the same box. This box has an intrusion detector in order to guarantee the security of said box. Security remains principally physical for this type of solution.

In a more sophisticated embodiment, sensitive data, which moves via the buses and between the functional units, is encrypted. This mode is generally restricted to the central unit, which encodes this data [before sending it] to remote memories or assemblies via the modem.

Different configurations are possible.

A first configuration is a monolithic assembly, in which all the functional sub-assemblies are combined into a single box.

A second configuration is a bi-module assembly, in which the functional sub-assemblies are combined in two boxes according to two combinations. According to the first combination, all the sub-assemblies except the printer and the principal power supply are combined in a first box, and the printer and the power supply (for example the mains) are combined in a second box. According to the second combination, all the sub-assemblies except the principal power supply unit are combined in a first box, and the principal power supply unit (for example the mains) is found in a second box.

Only the second box, which contains the central unit and the peripherals for the input/output of sensitive data, is protected against intrusions.

Traditional solutions impose a global protection of the box and connect functions of different intellectual values. Thus, noble functions that are grouped around the central unit (memories and applications) are de facto connected to the same scale of value as the box that contains them.

SUMMARY

A first object of this invention is to reduce the cost of a secure terminal. A second object of the invention is to improve the security of a secure terminal. At least one of these objects is achieved by a secure terminal according to claim 1.

With the secure terminal of the new invention, the noble functions can be dissociated from those that are not.

The central unit, the memory, the applications and the data, together with the associated security for protecting these elements (for example the security module (SAM), the infraction detector, or the encryption device) have an important value within a secure terminal.

The ancillary peripherals such as the printer, the card reader [and] the modem have a low value. It will be the same for the power supply unit and the mechanics (box).

With the secure terminal of the new invention, the most valued part of the terminal is detached from the ancillary peripherals and concentrates the security efforts.

The secure terminal of the new invention thus exhibits advantages at the economic level and at the security level.

BRIEF DESCRIPTION OF THE DRAWINGS

Other characteristics and advantages of the invention will appear in the following detailed but not exhaustive description of one embodiment and different alternatives, by reference to the appended drawings in which.

DETAILED DESCRIPTION

Figure 1:
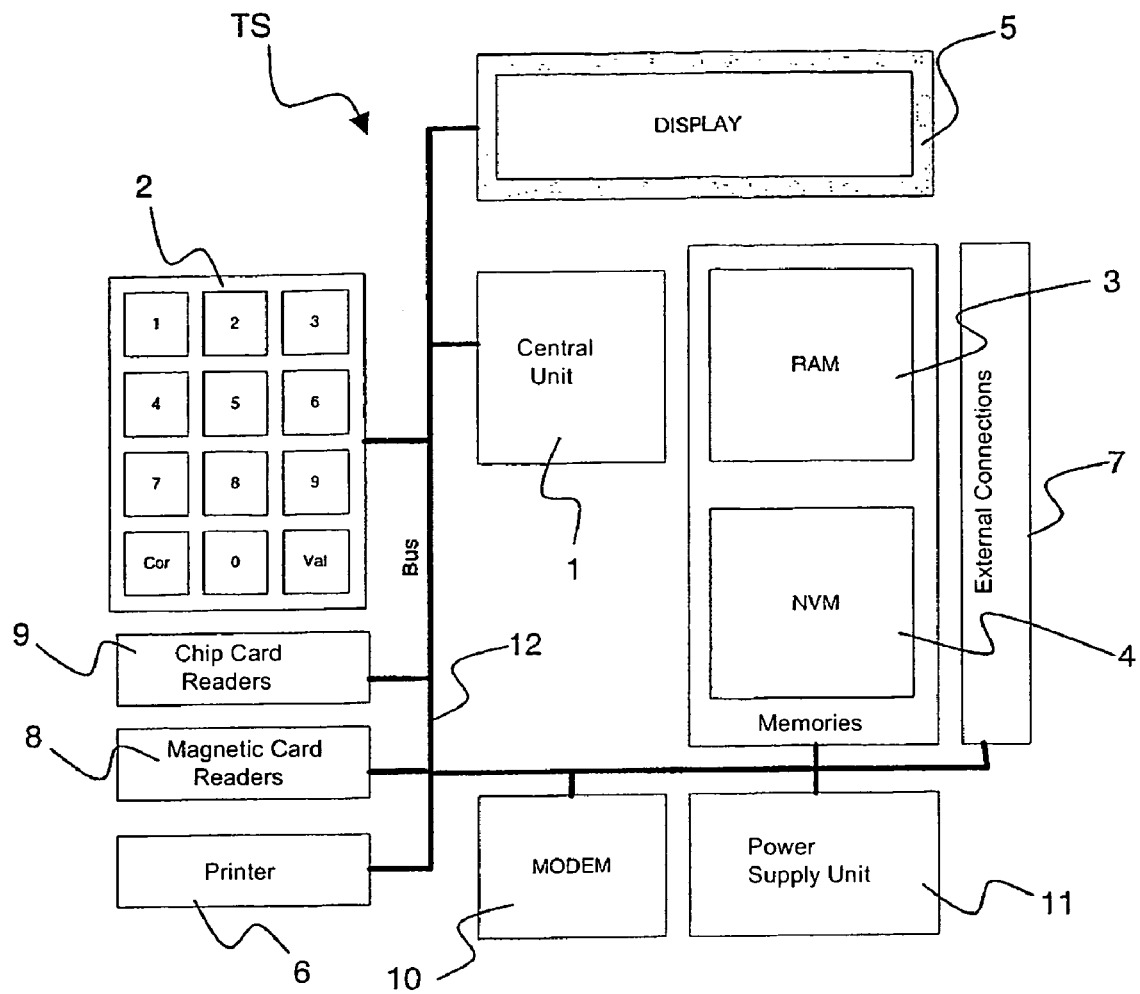
FIG. 1, described already, represents schematically the functional elements of a secure terminal, in particular [for] banking, according to previous designs.
Figure 2:
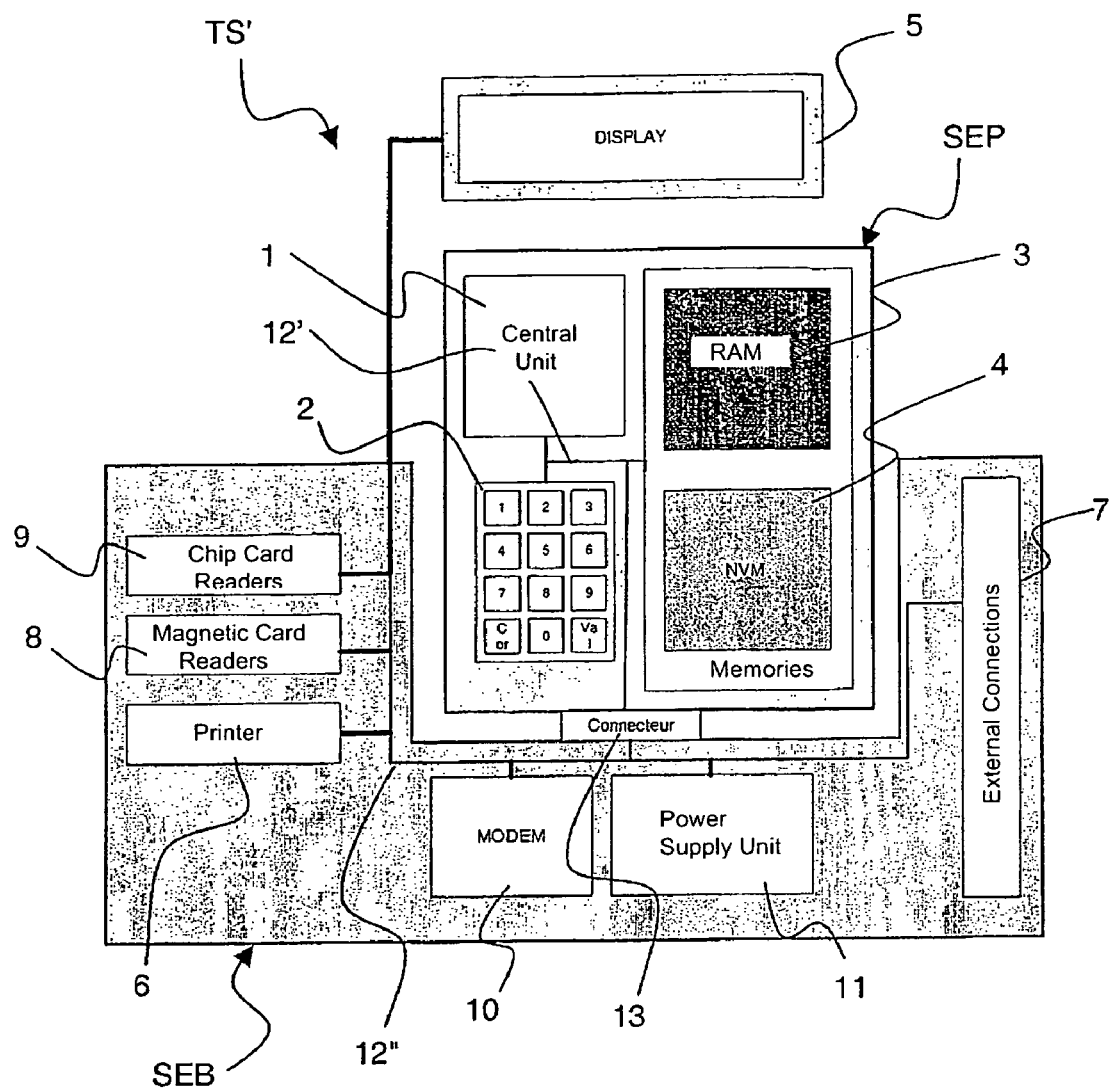
FIG. 2 illustrates schematically the functional elements of a secure terminal, for banking in particular, according to the invention.

FIG. 2 illustrates the functional breakdown of a secure banking terminal TS' according to the invention.

The value part is confined within a protected sub-assembly SEP that includes:
a central unit 1,
memories 3 and 4 in which data and applications are stored,
a keypad 2, which is a delicate peripheral to be protected.

All of these components are interconnected by a conventional bus 12'.

According to one alternative, the display 5 can be a constitutional part of this protected sub-assembly SEP, in particular if the latter does not have a means of encryption.

According to another alternative, the display 5 can be a constitutional sub-assembly of the basic sub-assembly SEB constituting the part with low added value. According to this alternative, an encrypted communication can be set up with the display. In this case, the display has symmetrical or asymmetrical cryptographic means.

The basic sub-assembly SEB embodies:
a printer 6,
an external connection interface 7 (serial or parallel),
a magnetic card reader 8 and/or a chip card reader 9,
a means of connection to a telecommunication network such as a modem 10, and
a power supply unit 11 as energy (battery and/or mains).

These components are interconnected by a conventional bus 12".

This protected sub-assembly is insertable, for example by means of a connector 13, in a basic sub-assembly SEB that is included in the part with low added value. The connector 13 is, for example, a connector of the PCMCIA type.

There is no need for this basic sub-assembly SEB to be certified.

The part(s) with low added value are combined in one or more boxes and one of them is intended to contain the valued and detachable sub-assembly SEP.

The protected sub-assembly SEP incorporates:
the applications,
the electronic architecture of the heart of the terminal,
the means providing the security (for example the SAM module, etc.).

The protected sub-assembly SEP constitutes a detachable module, easily distributable and capable of being integrated into a bank terminal by the same manufacturer or by a third party (OEM "Original Equipment Manufacturer or ODM "Original Design Manufacturer").

The protected sub-assembly SEP constitutes a sealed module, for example, impossible to dismantle without destruction. It can be certified. It contains the keypad used to enter sensitive data. The connection between the keypad 2 and the microcontroller 1 of the protected sub-assembly SEP proscribes any repair but permits the use of non-secure components. Therefore the protected sub-assembly SEP can be manufactured from standard components, comprising in particular a standard keypad, the securing of which is simple and economical. The level of security achieved is that traditionally termed "detection of evident fraud" (or "evident tamper").

The solution provided by the invention can also resolve problems of migration and maintenance.

Simple migration for a client from a former generation terminal to a new generation [terminal] exhibiting improved features (for example new printer, colour display, new modem (WIFI or ADSL). With the protected sub-assembly SEP, the data is transferred in total security and instantaneously to a new reception platform (basic sub-assembly SEB).

Maintenance is simplified in the event of a breakdown of the basic sub-assembly SEB as it suffices to detach the protected sub-assembly SEP and install it in a new basic sub-assembly SEB.

With the invention, it is possible to normalise the dimensions and/or the connector technology of the protected sub-assembly SEP in order to allow simplified migration for the terminal manufacturer. Indeed, the latter can change the architecture and technology of the protected sub-assembly SEP according to the opportunities offered by the market.

Maintenance of the protected sub-assembly SEP is simplified as the latter is sealed and is therefore disposable. By construction, the latter cannot be dismantled without destroying it.

Finally, from the point of view of the user, it is possible to share a basic sub-assembly SEB with several protected sub-assemblies SEP connected to different users (hypermarket, open market, etc.), the protected sub-assembly SEP thus fulfilling the task of "box" for personal and secure data.

What is claimed is:

1. A secure terminal comprising:
   principal means comprising:
      processing means,
      memories for storing data and programs, and
      a keypad for entering data,
         wherein elements constituting said principal means being interconnected by a first data bus and are combined in a protected box which is impossible to dismantle without deterioration of at least one element of said principal means; and
   peripherals of the principal means, the peripherals comprising:
      means of printing,
      means of reading from/writing to a card,
      means of access to a telecommunications network, and
      power supply unit for supplying power to the principal means and the peripheral means,
         wherein elements constituting said peripherals being interconnected by a second data bus and are combined in a non protected box;
   wherein the non protected box excludes the protected box, and
   wherein protected box and non protected box are connected by means of a single connector to enable communication between the first data bus and the second data bus, and wherein the protected box is detachable from the non protected box by the single connector without dismantling the non protected box to attach the protected box to a second non protected box.

2. The secure terminal according to claim 1, wherein the peripherals further comprise means of display.

3. The secure terminal according to claim 2, wherein the means of display communicates with the principal means by exchange of encrypted data.

4. The secure terminal according to claim 1, wherein the principal means comprises a means of display.

5. The secure terminal according to claim 4, wherein the means of display are not certified from the point of view of security.

6. The secure terminal according to claim 1, wherein the processing means, the memories, and the keypad are not certified from the point of view of security.

7. The secure terminal according to claim 1, wherein the means of printing, the means of reading from/writing to a card and the means of access to a telecommunication network are not certified from the point of view of security.

8. The secure terminal according to claim 1, wherein the processing unit, the memories, and the keypad are not certified from the point of view of security.

9. The secure terminal according to claim 1, wherein the printer, the card reader, and the external connection interface are not certified from the point of view of security.

10. The secure terminal of claim 1, wherein the non protected box comprises a physical slot for the protected box, and wherein the physical slot is a same width as the protected box.

11. The secure terminal of claim 10, wherein the width is the maximum width of the protected box, wherein at least three sides of the protected box are within the slot, and wherein at least one side of the protected box is exposed.

12. The secure terminal of claim 11, wherein the protected box is configured to be detachable from the non protected box without dismantling the non protected box.

13. A secure terminal comprising:
a protected sub-assembly comprising:
a processing unit,
memories for storing data and programs,
a keypad for entering data, and
a first data bus for connecting the processing unit, the memories, and the keypad,
wherein protected sub-assembly is physically located in a protected box; and
a first basic sub-assembly comprising peripherals of the protected sub-assembly, the peripherals comprising:
a printer,
a card reader,
an external connection interface,
a power supply unit for supplying power to the protected sub-assembly and the first basic sub-assembly, and
a second data bus for connecting the printer, the card reader, the external connection interface, and the power supply unit,
wherein the first basic sub-assembly is physically located in a first non protected box;
wherein the first non protected box excludes the protected box,
wherein connection between the protected box and the first non protected box consists of a single connector,
wherein the protected box is detachable from the first non protected box by the single connector without dismantling the first non protected box to attach the protected box to a second non protected box, and
wherein the single connector enables communication between the first data bus and the second data bus.

14. The secure terminal according to claim 13, wherein the first basic sub-assembly further comprises a display.

15. The secure terminal according to claim 14, wherein the display communicates with the protected sub-assembly by exchange of encrypted data.

16. The secure terminal according to claim 13, wherein the protected sub-assembly comprises a display.

17. The secure terminal according to claim 16, wherein the display is not certified from the point of view of security.

18. The secure terminal of claim 13, wherein the first non protected box comprises a physical slot for the protected box, and wherein the physical slot is a same width as the protected box.

19. The secure terminal of claim 18, wherein the width is the maximum width of the protected box, wherein at least three sides of the protected box are within the slot, and wherein at least one side of the protected box is exposed.

* * * * *